(12) United States Patent
Gubba Ravikumar et al.

(10) Patent No.: US 10,644,493 B2
(45) Date of Patent: May 5, 2020

(54) POWER SYSTEM DISTURBANCE DETECTION USING POWER AND FREQUENCY

(71) Applicant: Schweitzer Engineering Laboratories, Inc., Pullman, WA (US)

(72) Inventors: Krishnanjan Gubba Ravikumar, Pullman, WA (US); Ashish Upreti, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 65 days.

(21) Appl. No.: 15/968,559

(22) Filed: May 1, 2018

(65) Prior Publication Data

US 2018/0316175 A1 Nov. 1, 2018

Related U.S. Application Data

(60) Provisional application No. 62/492,828, filed on May 1, 2017.

(51) Int. Cl.
| | | |
|---|---|---|
| *H02H 1/00* | (2006.01) |
| *G05B 9/02* | (2006.01) |
| *H02H 3/00* | (2006.01) |
| *H02H 3/46* | (2006.01) |
| *H02H 7/26* | (2006.01) |

(52) U.S. Cl.
CPC ............. *H02H 1/0007* (2013.01); *G05B 9/02* (2013.01); *H02H 1/0092* (2013.01); *H02H 3/00* (2013.01); *H02H 3/46* (2013.01); *H02H 7/263* (2013.01)

(58) Field of Classification Search
CPC .................................................. H01H 207/006
USPC ......................................................... 700/293
See application file for complete search history.

(56) References Cited

U.S. PATENT DOCUMENTS

| | | | |
|---|---|---|---|
| 4,636,909 A | 1/1987 | Brandt |
| 4,672,501 A | 6/1987 | Bilac |
| 4,715,000 A | 12/1987 | Premerlani |
| 4,829,298 A | 5/1989 | Fernandes |
| 5,006,846 A | 4/1991 | Granville |
| 5,224,011 A | 6/1993 | Yalla |
| 5,398,029 A | 3/1995 | Toyama |
| 5,446,682 A | 8/1995 | Janke |
| 5,498,956 A | 3/1996 | Kinney |
| 5,592,393 A | 1/1997 | Yalla |
| 5,721,689 A | 2/1998 | Hart |
| 5,805,395 A | 9/1998 | Hu |
| 5,809,045 A | 9/1998 | Adamiak |
| 5,995,911 A | 11/1999 | Hart |
| 6,121,886 A | 9/2000 | Andersen |

(Continued)

OTHER PUBLICATIONS

Edmund O. Schweitzer, III, David Whitehead, Armando Guzman, Yanfeng Gong, Marcos Donolo, Advanced Real-Time Synchrophasor Applications, Oct. 2008.

(Continued)

*Primary Examiner* — Suresh Suryawanshi
(74) *Attorney, Agent, or Firm* — Richard M. Edge

(57) ABSTRACT

A system for determining a disturbance in an electrical power delivery system external to a distributed site based on rate of change of frequency and power flow at the distributed site. The system may open a breaker to isolate the distributed site from the electric power delivery system upon detection of a disturbance external to the distributed site.

20 Claims, 12 Drawing Sheets

(56) References Cited

U.S. PATENT DOCUMENTS

| | | | |
|---|---|---|---|
| 6,141,196 A | 10/2000 | Premerlani | |
| 6,148,267 A | 11/2000 | Premerlani | |
| 6,236,949 B1 | 5/2001 | Hart | |
| 6,311,307 B1 | 10/2001 | Adamiak | |
| 6,313,614 B1 | 11/2001 | Persson | |
| 6,324,039 B1 | 11/2001 | Gross | |
| 6,366,864 B1 | 4/2002 | Kulidjian | |
| 6,426,856 B1 | 7/2002 | Schneerson | |
| 6,446,682 B1 | 9/2002 | Viken | |
| 6,456,056 B1* | 9/2002 | Katoh | H02J 3/38 307/87 |
| 6,456,947 B1 | 9/2002 | Adamiak | |
| 6,571,182 B2 | 5/2003 | Adamiak | |
| 6,603,298 B2 | 8/2003 | Guzman-Casillas | |
| 6,662,124 B2 | 12/2003 | Schweitzer, III et al. | |
| 6,717,394 B2 | 4/2004 | Elms | |
| 6,738,269 B2 | 5/2004 | Nomiya | |
| 6,801,442 B2 | 10/2004 | Suzui | |
| 6,815,932 B2 | 11/2004 | Wall | |
| 6,845,333 B2 | 1/2005 | Anderson | |
| 6,934,654 B2 | 8/2005 | Benmouyal | |
| 7,230,809 B2 | 6/2007 | Whitehead | |
| 7,304,403 B2 | 12/2007 | Xu | |
| 7,328,114 B2 | 2/2008 | Premerlani | |
| 7,432,618 B2 | 10/2008 | Taylor | |
| 7,453,674 B2 | 11/2008 | Kuehnle | |
| 7,930,117 B2 | 4/2011 | Guzman-Casillas | |
| 8,346,402 B2* | 1/2013 | Guzman-Casillas | G01R 19/2513 700/292 |
| 9,917,436 B2* | 3/2018 | Popescu | H02H 7/261 |
| 2001/0012984 A1 | 8/2001 | Adamiak | |
| 2004/0186669 A1 | 9/2004 | Benmouyal | |
| 2006/0069522 A1 | 3/2006 | Bruno | |
| 2006/0247874 A1 | 11/2006 | Premerlani | |
| 2007/0008033 A1 | 1/2007 | Okazaki | |
| 2007/0086134 A1 | 4/2007 | Zweigle | |
| 2007/0136013 A1 | 6/2007 | Premerlani | |
| 2008/0080114 A1* | 4/2008 | Schweitzer | H02H 3/05 361/62 |
| 2008/0122293 A1 | 5/2008 | Ohm | |
| 2010/0161263 A1 | 6/2010 | Benmouyal | |
| 2010/0286838 A1 | 11/2010 | Guzman-Casillas | |
| 2012/0053744 A1* | 3/2012 | Manson | H02J 3/14 700/293 |
| 2013/0018521 A1* | 1/2013 | Manson | H02J 3/14 700/297 |
| 2014/0100702 A1* | 4/2014 | Schweitzer, III | G05B 13/02 700/286 |
| 2014/0104738 A1* | 4/2014 | Schweitzer, III | H02H 3/08 361/87 |
| 2015/0222123 A1* | 8/2015 | Manson | G05B 19/058 700/287 |
| 2017/0163029 A1* | 6/2017 | Hong | H02H 7/263 |
| 2018/0034258 A1* | 2/2018 | Schweitzer, III | H02H 7/265 |
| 2018/0034317 A1* | 2/2018 | Khatib | G05B 15/02 |

OTHER PUBLICATIONS

Cooper Power Systems, Product Brief, iGR-933 Rotating Equipment Isolating Device, Nov. 2007.

Cooper Power Systems, Protective Relays, iGR-933 Rotating Equipment Isolating Device (web page) <http://www.cooperpower.com/products/protective/idea/reid.asp> visited on Sep. 3, 2009.

John Mulhausen, Joe Schaefer, Mangapathirao Mynam, Armando Guzman, Marcos Donolo, Anti-Islanding Today, Successful Islanding in the Future, Sep. 18, 2009.

Venkat Mynam, Armando Guzman, Islanding Detection and Adaptive Load Shedding, Sep. 30, 2009.

Armando Guzman, Venkat Mynam, Islanding Detection for Distributed Generation, Aug. 27, 2009.

Tyco Electronics UK Limited, Crompton Instruments, Installation and Operating Instructions R.O.C.O.F. Protection Relay, Nov. 2008.

E. Roy Hamilton, John Undrill, Paul S. Hamer, Scott Manson, Considerations for Generation in an Islanded Operation, Apr. 16, 2009.

Musaab M. Almulla, Mohammed Akhil Fazil, Nicholas Seeley, Energy Management Systems for Islanded Industrial Facilities, Jan. 23, 2009.

Boungwook Cho, Heechul Kim, Musaab M. Almulla, Nicholas C. Seeley, The Application of a Redundant Load-Shedding System for Islanded Power Plants, Oct. 20, 2008.

Gabriel Benmouyal, Angelo D'Aversa, Concurrent Implementation of 81 Frequency Elements Together with Frequency Tracking in Protective Relays: Issues and Solutions, Sep. 18, 2009.

Daqing Hou, Relay Element Performance During Power System Frequency Excursions, Aug. 24, 2007.

A. G. Phadke, J. S. Thorp, M. G. Adamiak, A New Measurement Technique for Tracking Voltage Phasors, Local System Frequency, and Rate of Change of Frequency, IEEE Transactions on Power Apparatus and Systems, vol. PAS-102, No. 5, May 1983.

P J Moore, J H Allmeling, A T Johns, Frequency Relaying Based on Instantenous Frequency Measurement, IEEE 96 WM 066-1 PWRD, 1996.

\* cited by examiner

POWER SYSTEM DISTURBANCE DETECTION USING POWER AND FREQUENCY

RELATED APPLICATIONS

This application claims benefit under 35 U.S.C. § 119(e) to U.S. provisional application Ser. No. 62/492,828 filed on 1 May 2017 titled "Power System Disturbance Detection Using Power and Frequency" naming Krishnanjan Gubba Ravikumar and Ashish Upreti as inventors, which is incorporated herein by reference in its entirety.

TECHNICAL FIELD

This disclosure relates to systems and methods for controlling and protecting an electric power delivery system and, more particularly, to systems and methods for decoupling a portion of an electric power delivery system based on rate-of-change of frequency and power flow.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Figure 1:
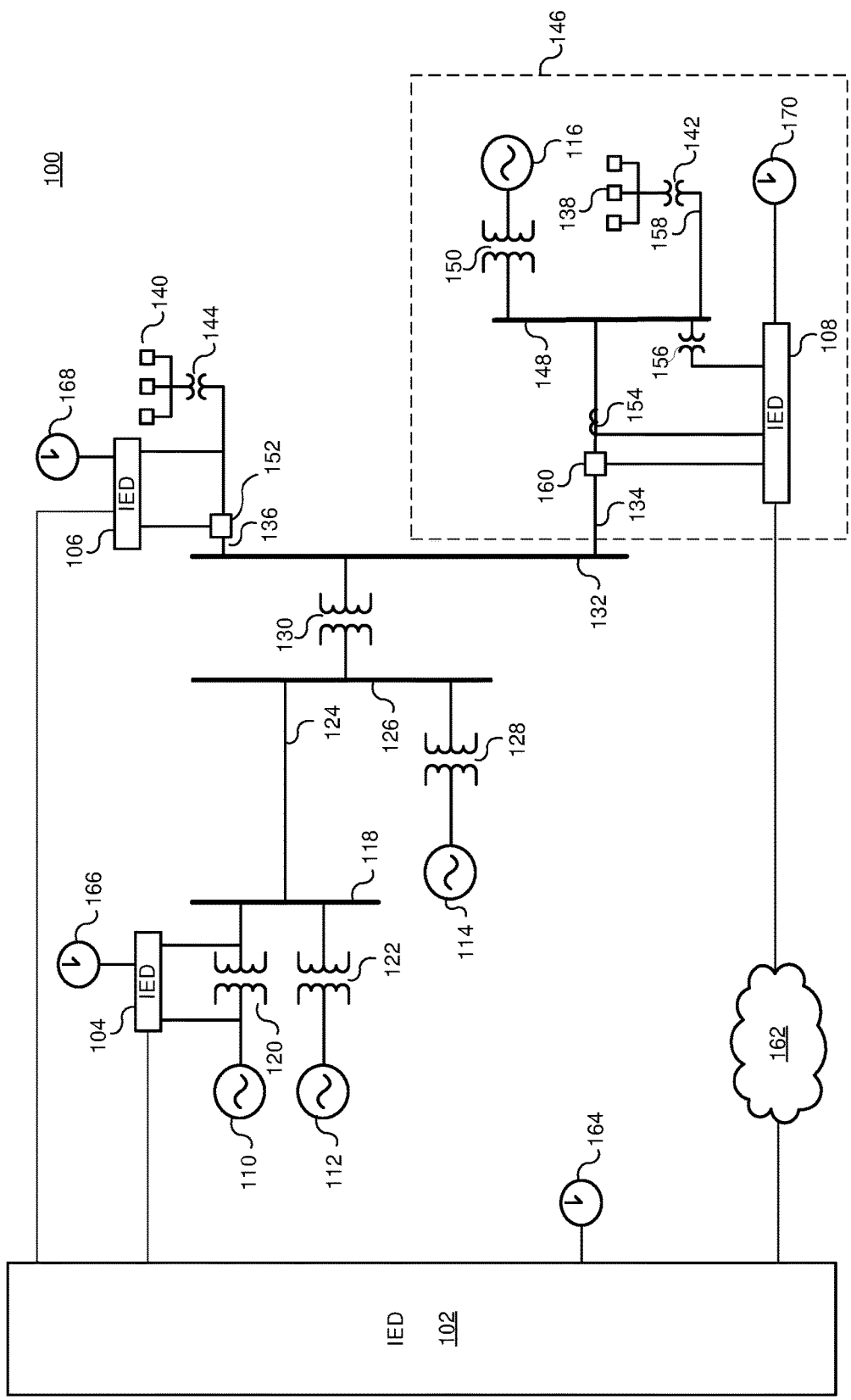
FIG. 1 illustrates a simplified diagram of one embodiment of an electric power delivery system that includes intelligent electronic devices.

Electric power delivery systems typically include electric power generation, transmission, distribution, and consumption. In various configurations, electric power delivery systems may include distributed generation capable of delivering sufficient electrical power to loads local to the distributed generation. For example, an industrial site may include an electrical tie to a utility as well as local distributed generation capable of supplying electric power to the industrial site. Accordingly, the industrial site may import electric power from the utility, export power to the utility, or become islanded (disconnected from) the island.

When a distributed generation site is connected to the utility, it may import or export power, and may become islanded from the utility. The distributed generation site may be monitored by an intelligent electronic device ("IED"), which may obtain voltage and/or current signals from the system, and determine electrical conditions of the distributed site using the signals. IEDs may determine an electrical frequency, frequency deviation from nominal, and rate-of-change-of-frequency in order to determine if a frequency disturbance exists. When a frequency disturbance does exist, the IED may disconnect the distributed site from the utility.

Previous solutions did not first determine if disconnection would benefit or further harm the distributed site. That is, if the disturbance is internal to the distributed site, disconnection from the utility may result in collapse of the distributed site as the distributed generation may not be capable of providing sufficient power to ride through the disturbance. In such instances, connection to the utility would be beneficial. Accordingly, what is needed is a system to detect a frequency disturbance and determine and effect a more appropriate control action. The improvements described herein consider not only the detected frequency, frequency deviation, and rate-of-change-of-frequency to determine a control action, but also considers whether electric power is flowing into or out of the distributed site.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments described are illustrated as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

Electrical power generation and delivery systems are designed to generate, transmit, and distribute electrical energy to loads. Electrical power generation and delivery systems may include equipment, such as electrical generators, electrical motors, power transformers, power transmission and distribution lines, circuit breakers, switches, buses, transmission lines, voltage regulators, capacitor banks, and the like. Such equipment may be monitored, controlled, automated, and/or protected using intelligent electronic devices (IEDs) that receive electric power system information from the equipment, make decisions based on the information, and provide monitoring, control, protection, and/or automation outputs to the equipment.

In some embodiments, an IED may include, for example, remote terminal units, differential relays, distance relays, directional relays, feeder relays, overcurrent relays, voltage regulator controls, generator relays, automation controllers, bay controllers, programmable automation controllers, and the like. Further, in some embodiments, IEDs may be communicatively connected via a network that includes, for example, multiplexers, routers, hubs, gateways, firewalls, and/or switches to facilitate communications on the networks. Networking and communication devices may also be integrated into an IED and/or be in communication with an IED. As used herein, an IED may include a single discrete IED or a system of multiple IEDs operating together.

Electrical power generation and delivery system equipment may be monitored and protected from various malfunctions and/or conditions using one or more IEDs. For example, an IED may be configured to protect the electrical power system equipment from abnormal conditions, such as when the power generation capabilities of the electrical power system cannot adequately supply system loads. Under this unbalanced system condition, power loss or blackouts may occur that negatively affect both providers of electric power and their customers. Consistent with embodiments disclosed herein, an IED may utilize rate-of-change of frequency and/or power flow to determine internal or external disturbances, and determine whether to separate a portion of the electric power delivery system. In various embodiments, the separation may result in an island condition.

A subsystem of the electric power delivery system may include generation and load. The subsystem may be monitored and protected by one or more IEDs. The IEDs may act according to the embodiments described herein to determine if a disturbance is internal or external to the subsystem, and then determine whether to disconnect the subsystem from the electric power delivery system.

FIG. 1 illustrates a simplified diagram of an electric power generation and delivery system 100 that includes IEDs 102-108 consistent with embodiments disclosed herein. Although illustrated as a one-line diagram for purposes of simplicity, electrical power generation and delivery system 100 may also be configured as a three-phase power system. Moreover, embodiments disclosed herein may be used in any electric power generation and delivery system and this disclosure is therefore not limited to the specific system 100 illustrated in FIG. 1. Accordingly, embodiments may be integrated, for example, in industrial plant power generation and delivery systems, deep-water vessel power generation and delivery systems, ship power generation and delivery systems, distributed generation power generation and delivery systems, and utility electric power generation and delivery systems.

The electric power generation and delivery system 100 may include generation, transmission, distribution, and power consumption equipment. For example, the system 100 may include one or more generators 110-116 that, in some embodiments, may be operated by a utility provider for generation of electrical power for the system 100. Generators 110 and 112 may be coupled to a first transmission bus 118 via step up transformers 120 and 122, which are respectively configured to step up the voltages provided to first transmission bus 118. A transmission line 124 may be coupled between the first transmission bus 118 and a second transmission bus 126. Another generator 114 may be coupled to the second transmission bus 126 via step up transformer 128.

A step-down transformer 130 may be coupled between the second transmission bus 126 and a distribution bus 132 configured to step down the voltage provided by the second transmission bus 126 at transmission levels to lower distribution levels at the distribution bus 132. One or more feeders 134, 136 may draw power from the distribution bus 132. The feeders 134, 136 may distribute electric power to one or more loads 138, 140. In some embodiments, the electric power delivered to the loads 138, 140 may be further stepped down from distribution levels to load levels via step down transformers 142 and 144, respectively.

Feeder 134 may feed electric power from the distribution bus 132 to a distributed site 146 (e.g., a refinery, smelter, paper production mill, or the like). Feeder 134 may be coupled to a distribution site bus 148. The distributed site 146 may also include a distributed generator 116 configured to provide power to the distribution site bus 148 at an appropriate level via transformer 150. In some embodiments, the distributed generator 116 may comprise a turbine configured to produce electric power from the burning of waste, the use of waste heat, or the like. The distributed site 146 may further include one or more loads 138. In some embodiments, the power provided to the loads 138 from the distribution site bus 148 may be stepped up or stepped down to an appropriate level via transformer 142. In certain embodiments, the distribution site 146 may be capable of providing sufficient power to loads 138 independently by the distributed generator 116, may utilize power from generators 110-114 via the transmission and distribution system, or may utilize both the distributed generator 116 and one or more of generators 110-114 to provide electric power to the loads.

IED 108 may be used to monitor and protect the distributed site 146 according to several embodiments herein. IED 108 may obtain a bus voltage from bus 148 using PT 156, and current to the distributed site 146 using CT 154. As will be described in more detail herein, IED 108 may use the obtained current and/or voltage to determine a power system frequency and rate of change of frequency of the distribution site 146. IED 108 may also use the current and voltage to determine power flow between the distributed site 146 and the reminder of the power delivery system. Using the rate of change of frequency and determined power flow, IED 108 may be configured to determine if a disturbance is internal or external to the distributed site 146, and further determine a protective action based on the determined disturbance. In one example, if IED 108 determines that the disturbance is external, IED may open breaker 160 to isolate distributed site 146 from the disturbance. In another example, if IED 108 determines that the disturbance is internal, IED 108 may open breaker 160 to isolate the disturbance from the power delivery system 100. In other examples, IED 108 may be configured to leave breaker 160 closed in the case of an external disturbance or an internal disturbance based on other factors. According to various embodiments, the determination of an external disturbance may be based on the speed governors of the generators operating in a particular mode such as, for example a droop control mode.

IEDs 102-108 may be configured to control, monitor, protect, and/or automate the electric power system 100. As used herein, an IED may refer to any microprocessor-based device that monitors, controls, automates, and/or protects monitored equipment within an electric power system. In some embodiments, IEDs 102-108 may gather status information from one or more pieces of monitored equipment. Further, IEDs 102-108 may receive information concerning monitored equipment using sensors, transducers, actuators, and the like. Although FIG. 1 illustrates separate IEDs monitoring a signal (e.g., IED 104) and controlling a breaker (e.g., IED 108), these capabilities may be combined into a single IED.

FIG. 1 illustrates various IEDs 102-108 performing various functions for illustrative purposes and does not imply any specific arrangements or functions required of any particular IED. In some embodiments, IEDs 102-108 may be configured to monitor and communicate information, such as voltages, currents, equipment status, temperature, frequency, speed, rotational velocity, mass, switch status, valve status, circuit breaker status, tap status, meter readings, and the like. Further, IEDs 102-108 may be configured to communicate calculations, such as phasors (which may or may not be synchronized as synchrophasors), events, fault distances, differentials, impedances, reactances, frequency, and the like. IEDs 102-108 may also communicate settings information, IED identification information, communications information, status information, alarm information, and the like. Information of the types listed above, or more generally, information about the status of monitored equipment, may be generally referred to herein as monitored system data.

In certain embodiments, IEDs 102-108 may issue control instructions to the monitored equipment in order to control various aspects relating to the monitored equipment. For example, an IED (e.g., IED 106) may be in communication with a circuit breaker (e.g., breaker 152), and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. Information of the types listed above, or more generally, information or instructions directing an IED or other device to perform a certain action, may be generally referred to as control instructions.

The distributed site 146 may include an IED 108 for monitoring, controlling, and protecting the equipment of the distributed site 146 (e.g., generator 116, transformer 142, etc.). IED 108 may receive monitored system data, including current signals via current transformer (CT) 154 and voltage signals via potential transformer (PT 156) from one or more locations (e.g., line 158) in the distribution site 146. The IED 108 may further be in communication with a breaker 160 coupled between the feeder 134 and the distribution site bus 148. In certain embodiments, the IED 108 may be configurable to cause the breaker 160 to disconnect the distribution site bus 148 from the distribution bus 132, based on monitored system data received via CT 154 and PT 156.

Feeder 136 may be communicatively coupled with an IED 106 configured to control a breaker 152 between the loads 140 and the distribution bus 132 based on monitored system data. In some embodiments, the power provided to the loads 140 from the distribution bus 132 may be stepped up or stepped down to an appropriate level via transformer 144. Like the IED 108 of the distribution site 146, monitored system data may be obtained by IED 106 using CTs and/or PTs (not shown).

Other IEDs (e.g., IED 104) may be configured to monitor, control, and/or protect the electric power generation and delivery system 100. For example IED 104 may provide transformer and generator protection to the step-up transformer 120 and generator 110. In some embodiments, IEDs 104-108 may be in communication with another IED 102, which may be a central controller, synchrophasor vector processor, automation controller, programmable logic controller (PLC), real-time automation controller, Supervisory Control and Data Acquisition (SCADA) system, or the like. In certain embodiments, IED 102 may be a real-time automation controller, such as is described in U.S. Patent Application Publication No. 2009/0254655, which is incorporated herein by reference in its entirety. IED 102 may also be a PLC or any similar device capable of receiving communications from other IEDs and processing the communications there from. In certain embodiments, IEDs 104-108 may communicate with IED 170 directly or via a communications network (e.g., network 162).

The central IED 102 may communicate with other IEDs 104-108 to provide control and monitoring of the other IEDs 104-108 and the power generation and delivery system 100 as a whole. In some embodiments, IEDs 104-108 may be configured to generate monitored system data in the form of time-synchronized phasors (synchrophasors) of monitored currents and/or voltages. In some embodiments, synchrophasor measurements and communications may comply with the IEC C37.118 protocol. In certain embodiments, IEDs 102-108 may receive common time signals for synchronizing collected data (e.g., by applying time stamps for the like). Accordingly, IEDs 102-108 may receive common time signals from time references 164-170 respectively. In some embodiments, the common time signals may be provided using a GPS satellite (e.g., IRIG), a common radio signal such as WWV or WWVB, a network time signal such as IEEE 1588, or the like.

Consistent with embodiments disclosed herein, IEDs 102-108 may be configured to determine a power system operating frequency from monitored system data. The operating frequency of the power system may be determined using many methods including, for example, measuring time between zero-crossings of an alternating voltage and/or current signal, measuring positive-sequence phasor rotations, measuring time between period voltage and/or current peaks, and/or the like. IEDs 102-108 may be further configured to calculate a power flow. For example, IED 108 may be configured to calculate a power flow to or from subsystem 146.

Figure 2:
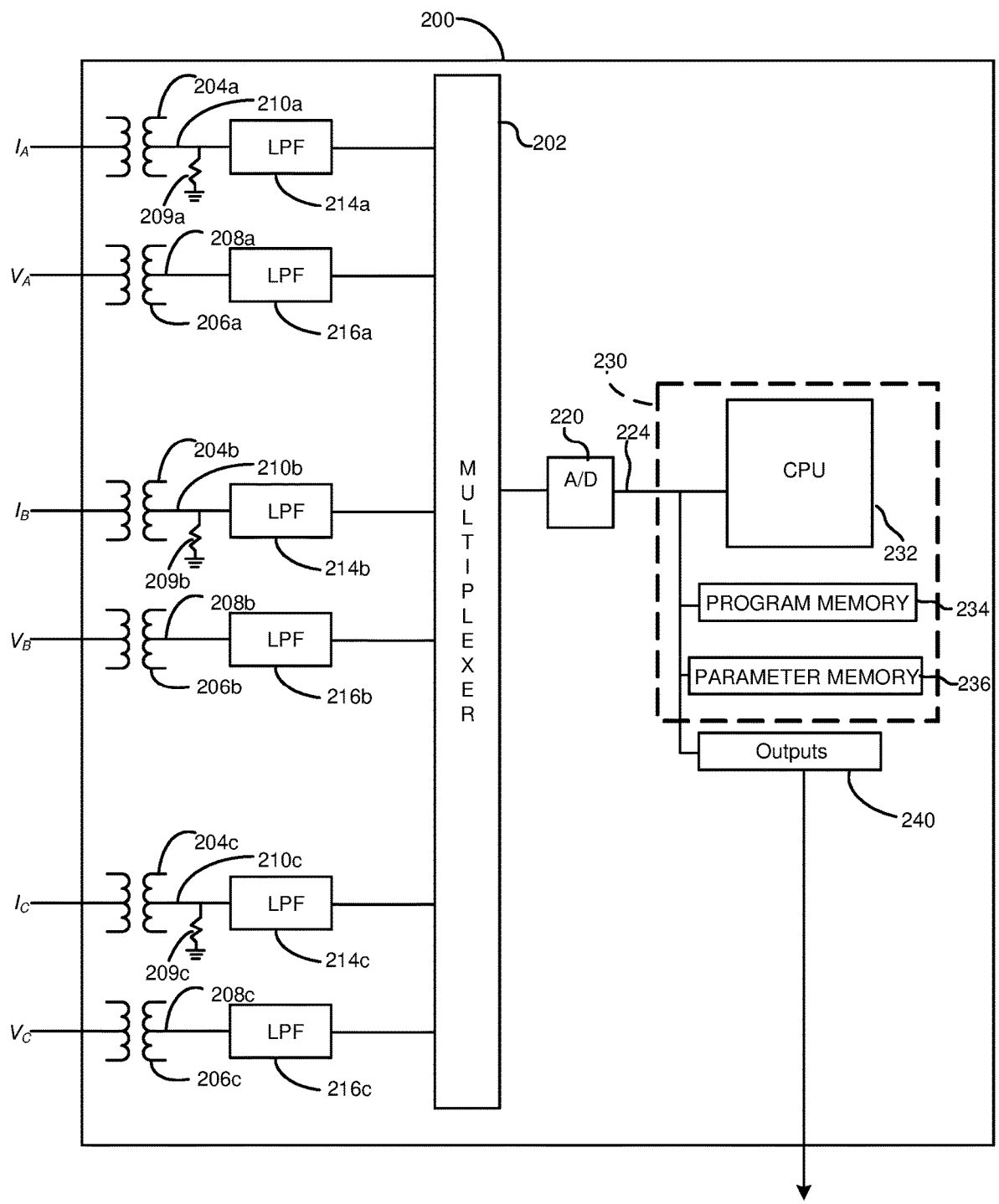
FIG. 2 illustrates a block diagram of one embodiment of an intelligent electronic device for protection and control of an electric power delivery system.

FIG. 2 illustrates a block diagram of an IED 200 according to several embodiments herein, which operates to provide such monitoring, protection, automation, and control. The IED 200 may be used, for example, in power system protection, automation, control, and/or metering applications to gather analog data directly from one or more conductors (not shown) using CTs 204a, 204b, and 204c and/or PTs 206a, 206b, and 206c. The PTs 206a, 206b, and 206c may be configured to step-down sensed voltage waveforms $V_A$, $V_B$, and $V_C$ (each corresponding to the secondary voltage of one of the three phases of the three-phase sinusoidal waveforms of the distributed generation site 146) to voltage waveforms 208a, 208b, and 208c having values that can be readily monitored and measured by the IED 200. Similarly, the CTs 204a, 204b, and 204c and resistors to ground 209a, 209b, and 209c may be configured to convert current signals from secondary CTs in communication with the electrical power delivery system. Low pass filters 214a, 214b, 214c, 216a, 216b, and 216c respectively filter the waveforms 210a, 210b, and 210c that are proportional to the current values and the voltage waveforms 208a, 208b, and 208c. The filtered waveforms are sampled using multiplexer 202. The multiplexer 202 may operate at a frequency higher than those of other digital processing components described below to reduce time skewing. An analog-to-digital converter 220 then samples and digitizes the selected waveforms to form corresponding digitized current and voltage signals 224.

The signals 224 are received by a microcontroller 230 configured to perform digital signal processing. For example, the microcontroller 230 may use cosine filters to eliminate DC and unwanted frequency components from the signals 224. In one embodiment, the microcontroller 230 includes a processing unit 232, such as a central processing unit (CPU) or microprocessor, a program memory 234 (e.g., a Flash EPROM), and a parameter memory 236 (e.g., an EEPROM). As will be appreciated by skilled persons, other suitable microcontroller configurations may be used. Further, although discussed in terms of the microcontroller 230, it should be noted that the embodiments disclosed herein may be practiced using one or more different types of processing units, such as field-programmable gate arrays (FPGAs), application specific integrated circuits (ASICs), or other types of programmable logic devices.

The processing unit 232 receives the signals 224 from the analog-to-digital converter 220. The processing unit 232, by executing a computer software program or logic scheme, processes the signals 224 to detect whether a predetermined condition has occurred. The processing unit 232 analyzes different characteristics of the signals 224. For example, the processing unit 232 may extract from the signals 224 phasors representative of the measured voltage waveforms 208a, 208b, and 208c and the current waveforms 210a, 210b, and 210c. To obtain the phasors, the processing unit 232 may use a filtering system, such as a full-cycle Fourier filter or a cosine filter. The processing unit 232 then performs various calculations and digital signal processing algorithms using the phasors to determine whether a predetermined condition has occurred. The processing unit 232 may also supply a signal (e.g., a trip command), via one or more of the outputs 240, to various components of the distributed generation site 146 based on the results of the calculations and digital signal processing.

The processing unit 232 is configured to determine, based on the signals 224, different characteristics of one or more of the waveforms $V_A$, $V_B$, $V_C$, $I_A$, $I_B$, and $I_C$ of the distributed generation site 146. For example, the processing unit may determine the frequency ($f_{signal}$), frequency deviation ($\Delta f$) from nominal frequency (e.g., 60 Hertz (Hz) or 50 Hz), a rate-of-change of frequency with respect to time (df/dt) of one or more of the waveforms $V_A$, $V_B$, $V_C$, $I_A$, $I_B$, and $I_C$, and power flow based on the signals 224. Some techniques for calculating frequency characteristics are described in U.S. patent application Ser. No. 12/343,734 titled "Independent Frequency Measurement and Tracking" naming Gabriel Benmouyal and Angelo D'Aversa as inventors, hereby incorporated by reference in its entirety. By analyzing $f_{signal}$ and/or $\Delta f$ over time, df/dt can be calculated.

In one example, the processing unit 232 may use a positive-sequence phasor (PSP), such as a positive-sequence voltage phasor derived from the voltage waveforms $V_A$, $V_B$, and $V_C$ or a positive-sequence current phasor derived from current waveforms $I_A$, $I_B$, and $I_C$, to calculate $f_{signal}$, $\Delta f$, and df/dt. Although the following example describes a technique of calculating these frequency characteristics using a positive-sequence voltage phasor, a positive-sequence current phasor may be calculated and used in place of or in conjunction with the positive-sequence voltage phasor. The processing unit 232 may calculate the positive-sequence voltage phasor using Equation 1:

$$V_1 = \frac{1}{3}(V_{Aphasor} + aV_{Bphasor} + a^2 V_{Cphasor}) \qquad \text{Eq. 1}$$

where:
 $V_1$ is the positive-sequence voltage phasor;
 $V_{Aphasor}$, $V_{Bphasor}$, and $V_{Cphasor}$ are voltage phasors derived from the waveforms $V_A$, $V_B$, and $V_C$ corresponding to a particular point of the system 100; and
 a is the complex number a=1∠120°.

In one embodiment, the characteristics $f_{signal}$, $\Delta f$, and df/dt can be calculated by analyzing the PSP over time. For example, the waveforms $V_A$, $V_B$, and $V_C$, or signals derived therefrom, are sampled at a sampling frequency $f_{sample}$ (e.g., where $f_{sample}$ is an integer multiple of the nominal frequency, $f_{nominal}$), and the PSP corresponding to the waveforms $V_A$, $V_B$, and $V_C$ is analyzed to determine whether the PSP rotates over time in the complex plane. If $f_{signal}$ satisfies a predetermined correspondence with $f_{nominal}$ (e.g., if $f_{signal}$ is equal to $f_{nominal}$), then the PSP will not rotate in the complex plane. When $f_{signal}$ is not equal to $f_{nominal}$, the PSP will rotate in the complex plane. Moreover, when the PSP rotates, the angular speed of rotation is proportional to $\Delta f$.

The frequency difference $\Delta f$ can be calculated by measuring an angle $\Psi_m$ (in radians) resulting from the PSP rotation over an interval of time $t_m$. For example, Equation 2 may be used to $\Delta f$:

$$\Delta f = \frac{\Psi_m}{2\pi t_m} \qquad \text{Eq. 2}$$

It should be noted that there are several ways of measuring a frequency of an alternating signal. Those specifically discussed herein are examples of ways of measuring frequency. Several embodiments herein may use these or other ways of determining a frequency of an alternating signal.

Figure 3:
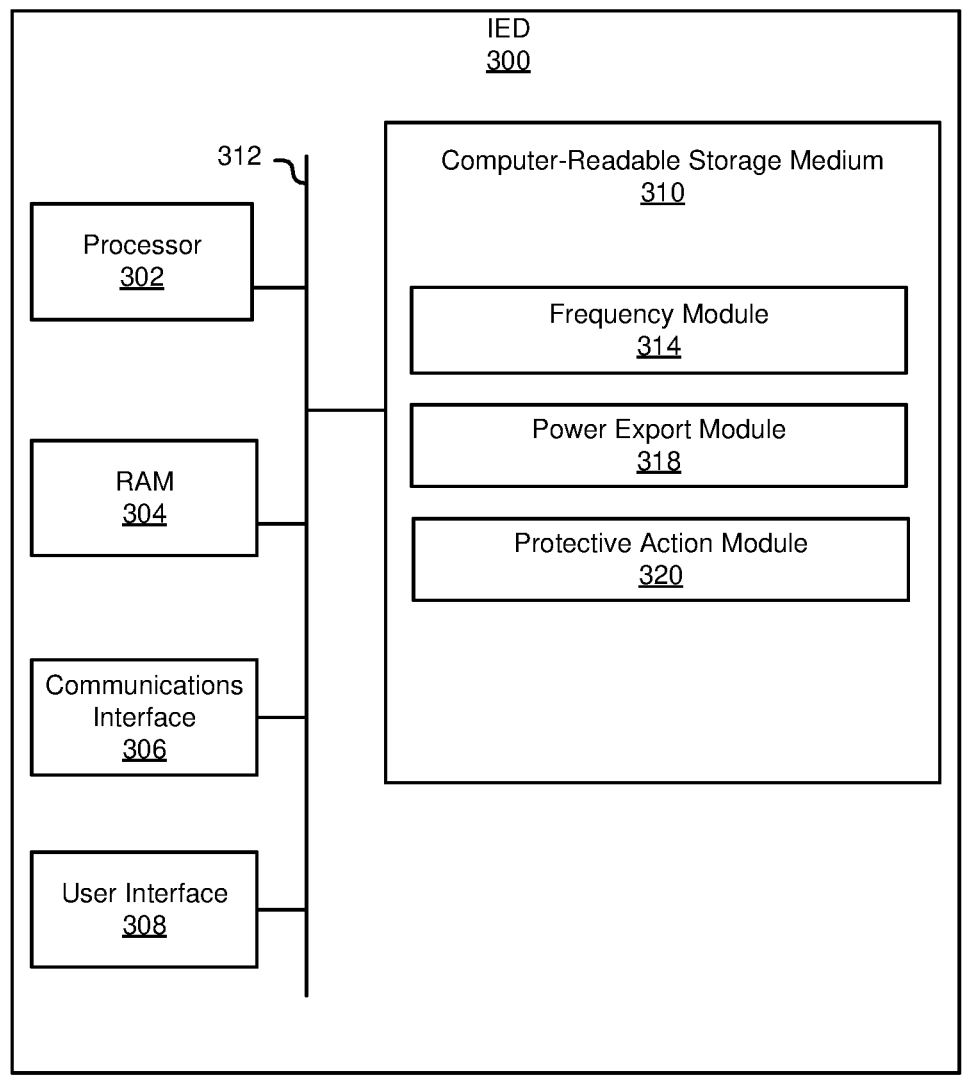
FIG. 3 illustrates another block of one embodiment of an intelligent electronic device for protection and control of an electric power delivery system.

FIG. 3 illustrates another block diagram of an IED 300 for protection and control of an electric power delivery system. As illustrated, IED 300 may include a processor 302, a random access memory (RAM) 304, a communications interface 306, a user interface 308, and a computer-readable storage medium 310. The processor 302, RAM 304, communications interface 306, user interface 308, and computer-readable storage medium may be communicatively coupled to each other via a common data bus 312. In some embodiments, the various components of IED 300 may be implemented using hardware, software, firmware, and/or any combination thereof.

The user interface 308 may be used by a user to enter user defined settings such as, for example, an amount of load to shed for each event level, load priority information, and the like (e.g., the parameters included in the user adjustable parameter module 202 of FIG. 2). The user interface 308 may be integrated in the IED 300 or, alternatively, may be a user interface for a laptop or other similar device communicatively coupled with the IED 300. Communications interface 306 may be any interface capable of communicating with IEDs and/or other electric power system equipment communicatively coupled to IED 300. For example, communications interface 306 may be a network interface capable of receiving communications from other IEDs over a protocol such as the IEC 61850 or the like. In some embodiments, communications interface 306 may include a fiber-optic or electrical communications interface for communicating with other IEDs.

The processor 302 may include one or more general purpose processors, application specific processors, microcontrollers, digital signal processors, FPGAs, or any other customizable or programmable processing device. The processor 302 may be configured to execute computer-readable instructions stored on the computer-readable storage medium 310. In some embodiments, the computer-readable instructions may be computer executable functional modules. For example, the computer-readable instructions may include a frequency module 314 configured to calculate frequency, rate of change of frequency, and determine whether the system is within a trip region as described hereunder. A power export module 318 may calculate a power flow direction. The protective action module 320 may determine a protective action based on the output of the frequency module 314 and the power export module 318. The computer-readable instructions may also include any of the functional modules described in reference to FIG. 2 to implement the functionality of the IED 200 described therein.

Figure 4A:
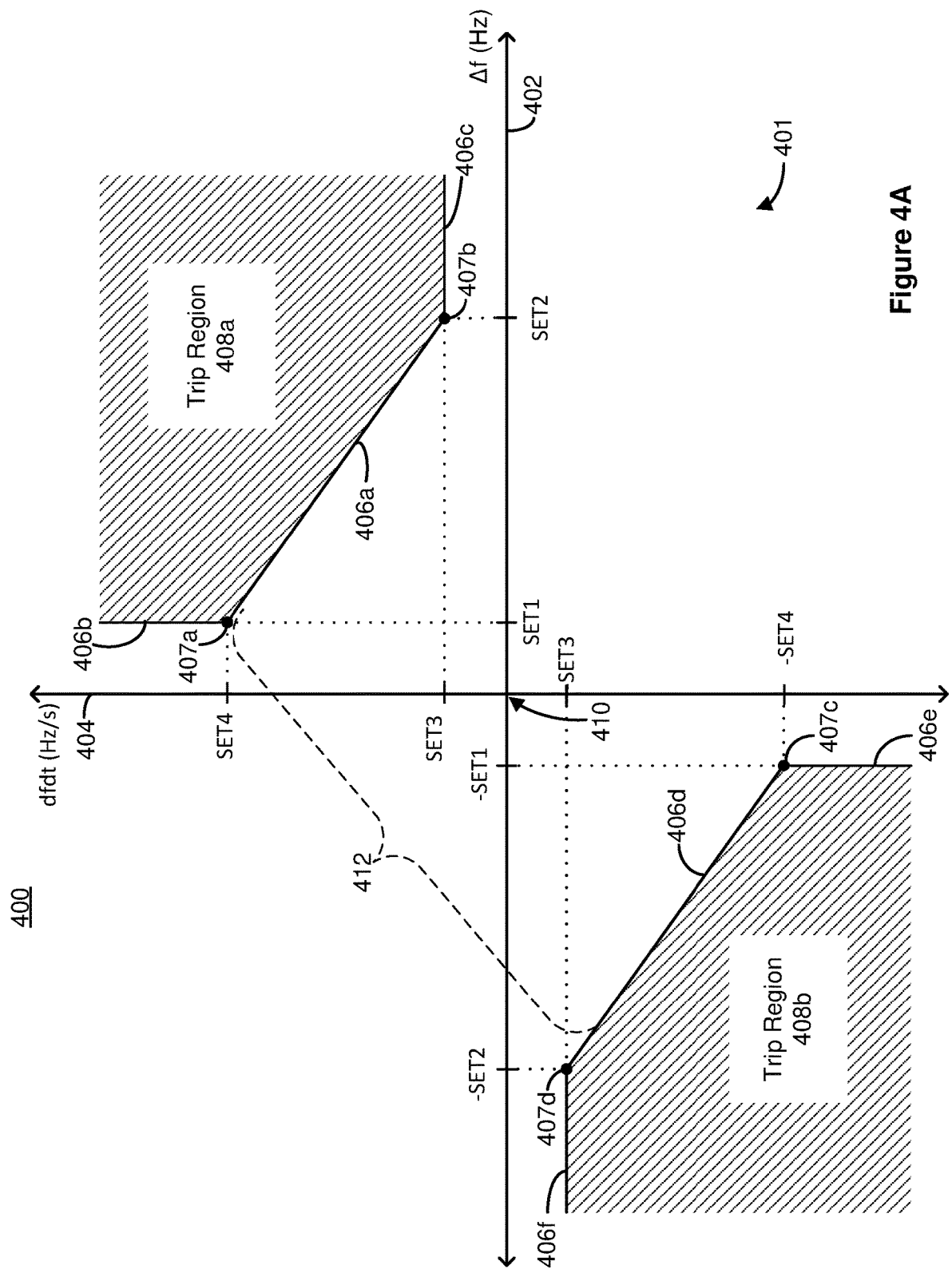
FIGS. 4A and 4B illustrate graphs representing protection characteristics for rate-of-change of frequency of an electric power system.

FIG. 4A illustrates a graph of a plane 400 depicting a protection characteristic 401 of the intelligent electronic device according to one embodiment. The plane 400 includes a frequency deviation from nominal frequency axis 402 (in units of Hz) and a rate-of-change of frequency axis 404 (in units of Hz-per-second (Hz/s)) transverse to the frequency deviation axis 402. The protection characteristic 401 includes a trip region 408a (in the first quadrant) bounded by boundary lines 406a, 406b, and 406c and a trip region 408b (in the third quadrant) bounded by boundary lines 406d, 406e, and 406f. An operating point ($\Delta f$, df/dt) of the distributed generation site 146 is obtained from the components of frequency deviation $\Delta f$ and the rate-of-change of frequency df/dt of the site 146. The IED operates to compare the operating point to the protection characteristic 401 to determine whether the operating point is in one of the trip regions 408a or 408b.

The trip regions 408a and 408b and their corresponding boundary lines 406a, 406b, 406c, 406d, 406e, and 406f are derived from trip settings SET1, SET2, SET3, and SET4 in which SET1 and SET2 represent selected frequency deviation values and SET3 and SET4 represent selected rate-of-change of frequency values. In one application, SET1 is set to 0.1 Hz, SET2 is set to 1 Hz, SET3 is set to 0.2 Hz/s, and SET4 is set to 2.5 Hz/s. The boundary line 406a is a line segment passing between a first boundary point 407a having coordinates (SET1, SET4) and a second boundary point 407b having coordinates (SET2, SET3). The boundary line 406b is a line extending from the first boundary point 407a in a direction away from the frequency deviation axis 402 and parallel to the rate-of-change of frequency axis 404. The boundary line 406c is a line extending from the second boundary point 407b in a direction away from the rate-of-change of frequency axis 404 and parallel to the frequency deviation axis 402. The boundary line 406d is a line segment passing between a third boundary point 407c having coordinates (−SET1, −SET4) and a fourth boundary point 407d having coordinates (−SET2, −SET3). The boundary line 406e is a line extending from the third boundary point 407c in a direction away from the frequency deviation axis 402 and parallel to the rate-of-change of frequency axis 404. The boundary line 406f is a line extending from the fourth boundary point 407d in a direction away from the rate-of-change of frequency axis 404 and parallel to the frequency deviation axis 402.

As depicted in FIG. 4A, the boundary lines 406a and 406d include negative slopes. The boundary lines 406a and 406d are set at a distance from an origin 410 (representing a state where $\Delta f$=0 and df/dt=0) to define the stable operation region 412 between the trip regions 408a and 408b. The slope of the boundary lines 406a and 406d and their locations with respect to the origin 410 may be determined experimentally to achieve fast and reliable detection of conditions and to prevent stable oscillations from entering one of the trip regions 408a or 408b. The protection characteristic 401 allows the IED to detect a predetermined condition faster than a system that does not include the characteristic 401. In a comparative example, a system that does not include trip regions 408a and 408b bounded by boundary lines 406a and 406d may, instead, include a rate-of-change of frequency threshold set at 2.5 Hz/s (representing a horizontal line at 2.5 Hz/s in plane 400) and/or a frequency deviation threshold set at 1 Hz (representing a vertical line at 1 Hz in plane 400)). If an islanding condition occurs in which Δf and df/dt increase, the operating point will likely cross the boundary line 406a of the IED before the point crosses a frequency deviation threshold set at 1 Hz and/or a rate-of-change of frequency threshold set at 2.5 Hz/s of the comparative system. Thus, the boundary lines 406a and 406d allow the IED 100 to be relatively sensitive to quickly detect certain conditions, yet not overly sensitive such that the IED issues false alarm trip commands when some stable oscillations are present in the distributed generation site 35.

Figure 4B:
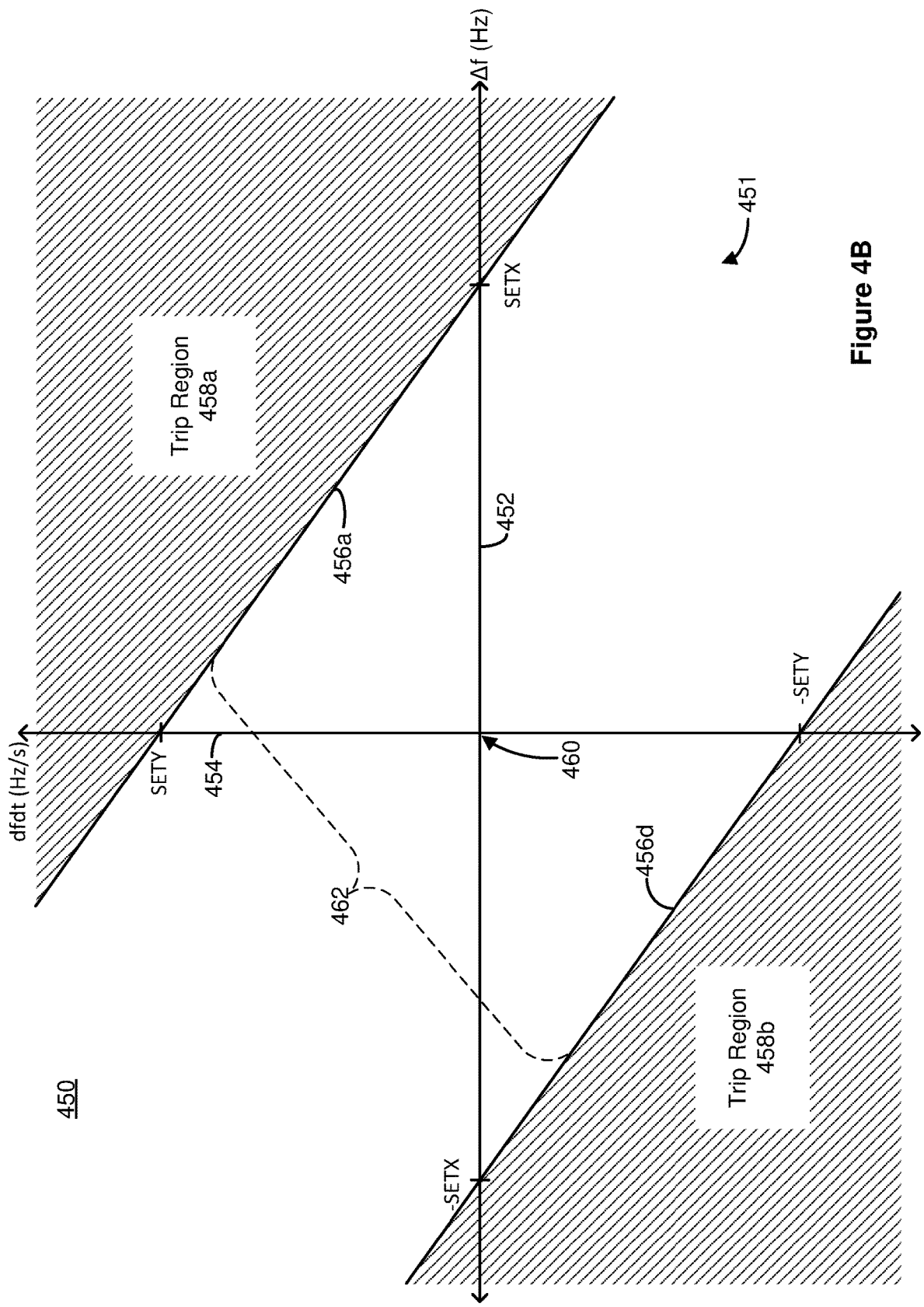

FIG. 4B is a graph of a plane 450 depicting another protection characteristic 451 of the IED. As with FIG. 4A, the plane 450 includes a frequency deviation from nominal frequency axis 452 and a rate-of-change of frequency axis 454. The protection characteristic 451 includes a trip region 458a bounded by boundary line 456a, and a trip region 458b bounded by boundary line 456d. An operating point (Δf, df/dt) of the distributed generation site 146 is obtained from the components of frequency deviation Δf and the rate-of-change of frequency df/dt of the site 35. The processing unit 132 operates to compare the operating point to the protection characteristic 451 to determine whether the operating point is in one of the trip regions 458a or 458b.

The trip regions 458a and 458b and their corresponding boundary lines 456a, and 456d are derived from trip settings SETX, and SETY in which SETX represents a selected frequency deviation value and SETY represents a selected rate-of-change of frequency value. In one application, SETX is set to 1.0 Hz, and SETY is set to 2.5 Hz/s. The boundary line 456a is a line passing through the points (SETX, 0) and (0, SETY). The boundary line 456d is a line passing through the points (-SETX, 0) and (0, -SETY).

As depicted in FIG. 4B, the boundary lines 456a and 456d include negative slopes. The boundary lines 456a and 456d are set at a distance from an origin 460 (representing a state where Δf=0 and df/dt=0) to define the stable operation region 462 between the trip regions 458a and 458b. The slope of the boundary lines 456a and 456d and their locations with respect to the origin 460 may be determined experimentally to achieve fast and reliable detection of islanding conditions and to prevent stable oscillations from entering one of the trip regions 458a or 458b. As with the characteristic of FIG. 4A, the protection characteristic 451 allows the IED 100 to detect a predetermined condition faster than a system that does not include the characteristic 451.

According to several embodiments, the IED may determine whether the disturbance is internal to the subsystem or external to the subsystem depending on the specific determined trip region and a direction of power flow. The frequency is found to be increasing when the operating point falls within trip regions 408a or 458a. The frequency is found to be decreasing when the operating point falls within trip regions 408b or 458b.

Figure 5:
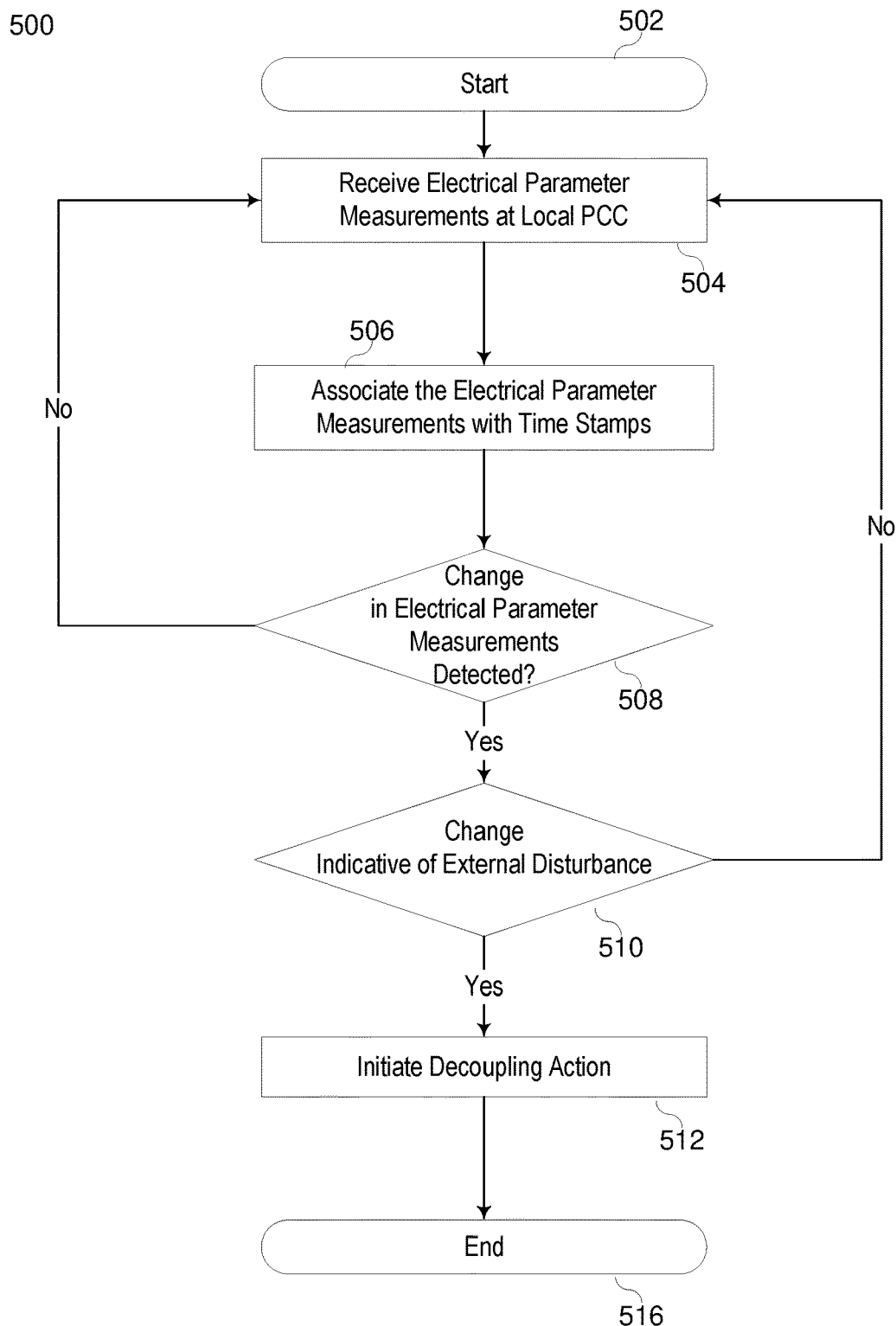
FIG. 5 illustrates a flow chart of a method for detecting internal and external events using rate-of-change of frequency and power flow.

FIG. 5 generally illustrates a flow chart of a method for determining whether a disturbance is internal or external to a distributed system based on frequency and power flow. The method starts 502 with receiving electrical power system measurements at a local power control center (PCC) 504 such as IED 108. The IED may associate the electrical parameter measurements with time stamps 506, and determine a change in electrical parameter measurements (such as, for example, a change in frequency or rate of change of frequency, or combinations thereof) 508. If no change is detected, the method continues to receive the electrical parameter measurements 504. If a change is detected, the method may determine whether the change is indicative of an external disturbance 510. In one embodiment, if the change is not due to an external disturbance, then the system continues to receive the electrical parameter measurements. If, however, the system determines that the change is indicative of an external disturbance, the system may effect a protective action such as, for example, initiating a decoupling action 512. For example, the system of FIG. 1 may open circuit breaker 160 when IED 108 determines that the disturbance is external to the distributed site 146.

It has been observed that if a power system observes a loss of generation, the power system frequency tends to decay. When the operating point enters into a trip region due to a loss of generation or decay in frequency (e.g., regions 408b or 458b), an IED may be configured to determine if the disturbance (or loss of generation) causing the decay is internal to the protected system or external to the protected system. In terms of FIG. 1, IED 108 may be required to determine if the disturbance is internal or external to distributed site 146. If the decay in frequency is accompanied by a change in power flow out of the protected system, then it may be determined that the disturbance is external to the protected system. Alternatively, if the decay in frequency is accompanied by a change in power flow into the protected system, then it may be determined that the disturbance is internal to the protected system.

Furthermore, it has been observed that that if a power system observes a loss of load, the power system frequency tends to rise. When the operating point enters into a trip region due to a loss of load or rise in frequency (e.g. regions 408a or 458a), an IED may be configured to determine if the disturbance (or loss of load) causing the rise is internal to the protected system or external to the protected system. In terms of FIG. 1, IED 108 may be required to determine if the disturbance is internal or external to distributed site 146. If the rise in frequency is accompanied by a change in power flow out of the protected system, then it may be determined that the disturbance is internal to the protected system. Alternatively, if the rise in frequency is accompanied by a change in power flow into the protected system, then it may be determined that the disturbance is external to the protected system.

Figure 6:
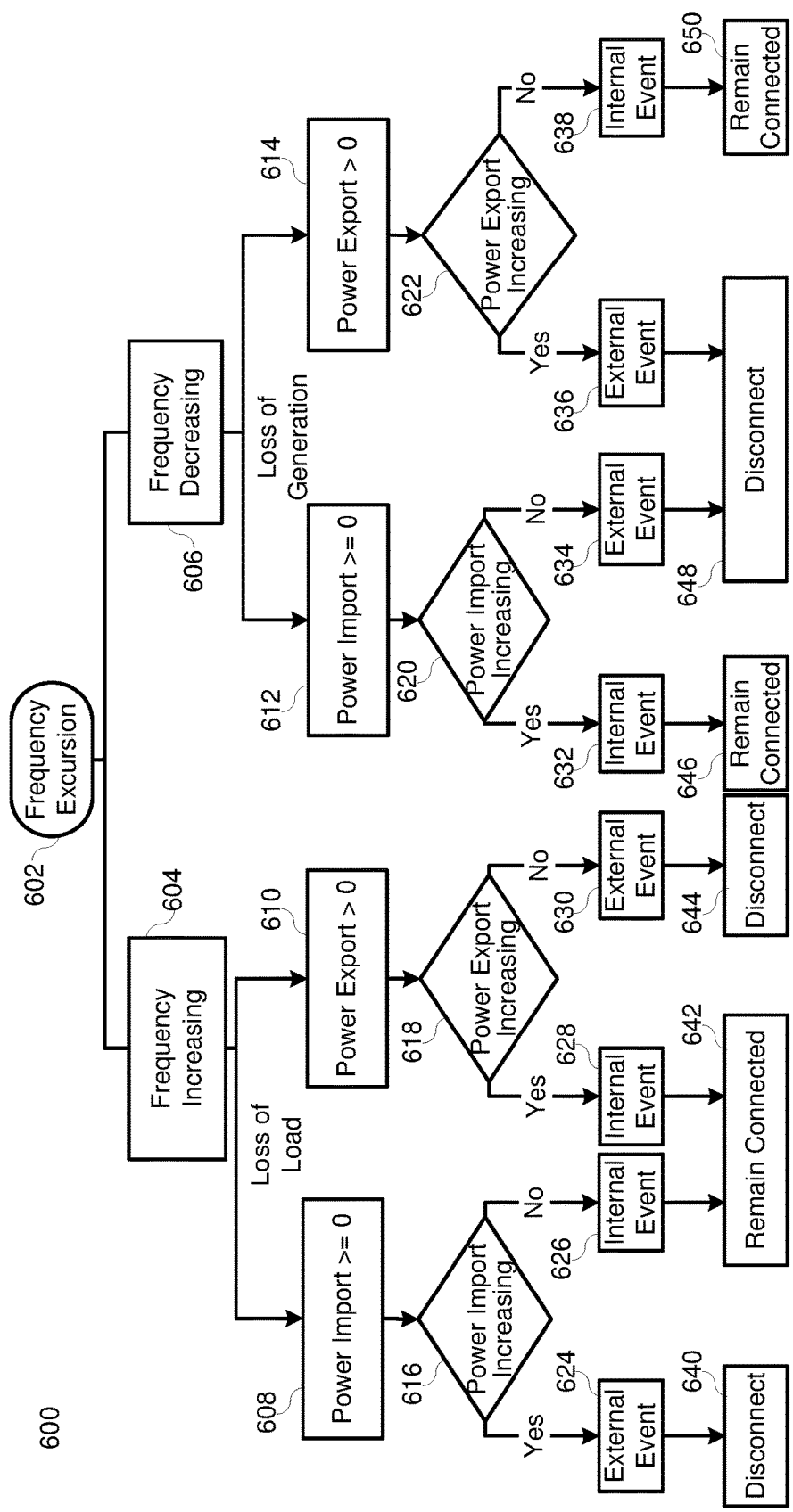
FIG. 6 illustrates a flow chart of a method for protecting an electric power delivery system using frequency excursions and power flow information according to several embodiments herein.

FIG. 6 illustrates a flow chart of a method for protecting an electric power delivery system using frequency excursions and power flow information according to several embodiments herein. The illustrated method 600 may be useful for determining whether a disturbance is internal or external to a protected system receiving electric power from an electric power delivery system such as distributed site 146 of FIG. 1. In general, a portion of the electric power delivery system disconnects from the electric power delivery system when a frequency excursion is detected and power is flowing out of the portion to be disconnected. In various embodiments, the portion to be disconnected may be a distributed generation site with loads, an industrial site, or the like such as the distributed site 146 of FIG. 1.

The method starts with determining wither a frequency excursion has occurred 602. The occurrence of a frequency excursion may be detected according to several embodiments herein, such as, for example, the system entering into trip regions 408a or 408b of FIG. 4A or 458a or 458b of FIG. 4B. In various other embodiments, the frequency excursion may be detected when the frequency exceeds a predetermined high threshold, or falls below a predetermined low threshold. In still other embodiments, the frequency excursion may be detected when a rate-of-change-of-frequency exceeds a predetermined upper threshold, or falls below a predetermined lower threshold. The frequency excursion may be detected when the frequency and/or rate of change of frequency is outside of a predetermined nominal operating condition. As illustrated, the frequency may be determined to be increasing 604 or decreasing 606. If the operating point is within areas 408a or 458a, the operating point is within the positive trip region (the frequency is increasing 604). In other embodiments, if the frequency exceeds the predetermined high threshold, or the rate-of-change-of-frequency exceeds the predetermined upper threshold, then the frequency is increasing 604. If the operating point is within areas 408b or 458b, the operating point is within the negative trip region (the frequency is decreasing) 606. In other embodiments, if the frequency exceeds the predetermined low threshold, or the rate-of-change-of-frequency falls below the predetermined lower threshold, then the frequency is decreasing 606.

Upon determining whether the frequency is increasing (positive trip region) 604 or decreasing (negative trip region) 606, the system may determine whether power is imported (or flowing into) 608, 612 the portion of the electric power delivery system, or power is exported (out of) 610, 614 the portion of the electric power delivery system.

Power flow may be calculated according to various power flow calculations. In one embodiment, power flow may be calculated using local voltage and current measurements. For example, the real power flow may be calculated according to Equation 3:

$$P = V*I \cos(\phi) \quad \text{Eq. 3}$$

where:
P is the power;
V is the voltage;
I is the current; and
$\phi$ is the angle from the current to the voltage.

For multi-phase systems, power may be calculated for all phases. In several embodiments, the reactive power, Q, may be calculated according to Equation 4:

$$Q = V*I \sin(\phi) \quad \text{Eq. 4}$$

For multi-phase systems, the reactive power may be calculated for all phases. With active and reactive power, S, the apparent power may be calculated according to Equation 5:

$$S = \sqrt{P^2 + Q^2} \quad \text{Eq. 5}$$

For the various embodiments herein, the active power, reactive power, and/or apparent power may be used to determine the power flow. In various embodiments, the power flow may be averaged over time. Various corrections may be made to the power flow calculations as needed such as, for example, k-factor corrections. In various embodiments, it is only the sign or direction of the power flow that is needed to determine the power flow.

In some embodiments, power flow may be determined using voltages only at two different locations on the power system such as buses at the distributed site and at the electric power delivery system. For example, the voltage angle between buses 148 and 132 may be used to determine power flow into or out of distributed site 146 of FIG. 1.

Returning to FIG. 6, upon determination that the frequency is increasing 604, power is being imported 608, and that the power import is increasing 616, the system determines that the event is external 624. Because the event is external, the system determines that the distributed site should be disconnected 640. Alternatively, if the power import is not increasing at 616, then it is determined that the event is internal 626, and the system determines that the distributed site remains connected 642 to the electric power delivery system.

If, however, the frequency is increasing 604, power is being exported 610 from the distributed site, and the power export is increasing 618, then it is determined that the event is internal 628 and the system determines that the distributed site remains connected 642 to the electric power delivery system. However, if the power export is not increasing 618, then it is determined that the event is external 630, and the system determines to disconnect the distributed site from the electric power delivery system 644.

When a frequency excursion is detected 602 and it is determined that the frequency is decreasing 606, then the system determines if power is being imported or exported 612, 614. When power is being imported 612 and the power import is increasing 620, then it is determined that the event is internal 632, and the system determines to remain connected to the electric power delivery system. However, if it is determined that the power import is not increasing 620, then an external event is detected 634, and the system determines to disconnect the distributed site from the electric power delivery system 648.

If, however, the frequency is decreasing 606 and power is being exported 614, then it is determined if the power export is increasing 622. When the power export is increasing 622, then an external event is detected 636, and the system determines to disconnect the distributed site from the electric power delivery system 648. However, if the power export is not increasing 622, then an internal event is detected 638, and the system determines to remain connected 650 to the electric power delivery system.

In the embodiments described and illustrated in conjunction with FIG. 6, power may be determined to be imported when the power flow is zero or when the power flow into the distributed site is greater than zero. For instances where the frequency is increasing, it may be due to a loss of load either in the distributed site or external to the distributed site. The power flow and determination of power flow increasing or decreasing may be used as described and illustrated to determine whether the event is internal or external. For example, when a load is lost outside of the distributed site, the power import into the distributed site would be expected to increase, which may be remedied by disconnecting the distributed site, isolating the distributed site from the external event causing the power flow increase. However, if the power flow is not increasing, the lost load is determined to be internal to the distributed site, in which case disconnection may accelerate the frequency excursion.

In such embodiments where the frequency is decreasing, the event may be a loss of generation either internal or external to the distributed site. The power flow and determination of power flow increasing or decreasing may be useful to determine whether the loss of generation is internal or external to the distributed site. For example, where power is imported and the power import is increasing, it may be due to an internal loss of generation, and remaining connected to the electric power delivery system may provide the additional generation needed at the distributed site. However, if the power import is not increasing, then the loss of generation is determined to be external, and the distributed site may disconnect so as to avoid further feeding power from the distributed generation into the electric power delivery system.

In further embodiments, the present disclosure may include a determination of incremental and decremental reserve margins. Incremental reserve margin refers to the increase in output of generation that can be achieved in a short time interval, where the decremental reserve margin refers to the increase in the amount of load that can be added or picked up (or generation backed off) in a short time. Incremental and decremental reserve margin may be settings or predetermined for a particular power system or distributed site. In several embodiments herein, incremental and/or decremental reserve margins may be used to further determine whether to disconnect a distributed site upon determination of a frequency excursion due to an event external to the distributed site.

Figure 7A:
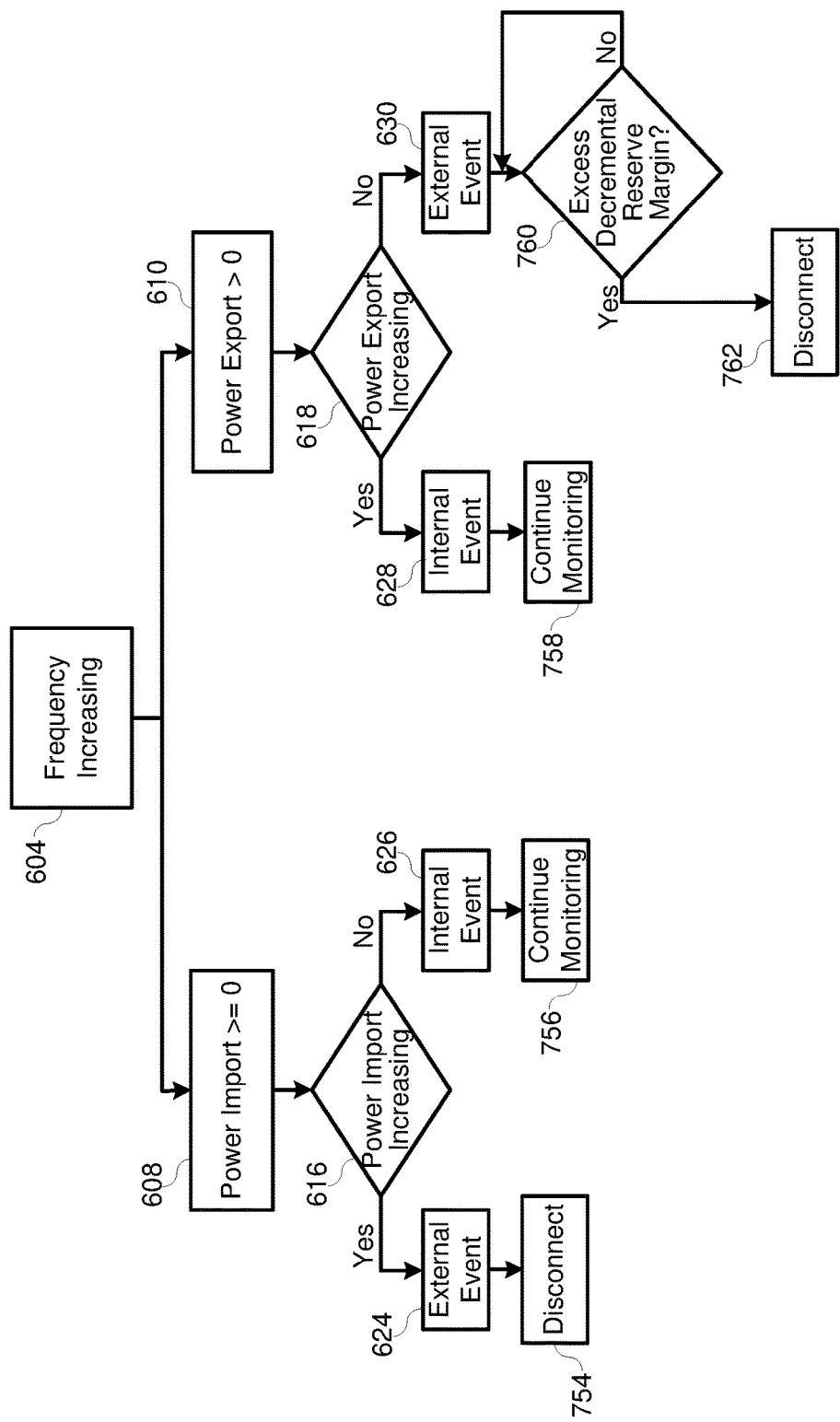
FIG. 7A illustrates a flow chart of a method for protecting an electric power delivery system using frequency excursions, power flow information, and decremental reserve margin according to several embodiments herein.

FIG. 7A illustrates a method that may be used to protect an electric power delivery system similar to that illustrated in FIG. 6, with the added determination of whether excess decremental reserve margin exists. In particular, after determination of a frequency excursion and the frequency is increasing 604 (loss of load), with power being imported 608, and the power import increasing 616, the system may determine that the event is external 624 to the distributed site, and the method may determine to disconnect 754 the distributed site from the electric power delivery system.

However, when power is being exported 610 for an excursion where frequency is increasing 604, the system determines whether the power export is increasing. If the power export is not increasing, then it is determined that the event is external 630, but before disconnecting, the system may determine whether excess decremental reserve margin exists 760. If excess decremental reserve margin does not exist 760, then the system may continue to monitor; however, if excess decremental reserve margin does exist 760, then the system may determine to disconnect 762 from the electric power delivery system. In one particular embodiment, the system may determine whether the decremental reserve margin exceeds the power export. When the decremental reserve margin does exceed the power export, then the method disconnects the distributed site from the electric power delivery system and effects generation balancing of the distributed site. When the decremental reserve margin does not exceed the power export, then the method does not disconnect the distributed site from the electric power delivery system, but continues to monitor. Generation balancing may include shedding generation, adding load, or the like such that the electric power generated matches the electric power consumed on the distributed site.

For instances where an internal event is determined 626, 628, the method may continue to monitor 756, 758 the electric power delivery system. Continued monitoring may include continued monitoring for frequency excursions, external or internal events, power flow, overcurrent, undervoltage, or any manner of electric power system monitoring and protection.

Figure 7B:
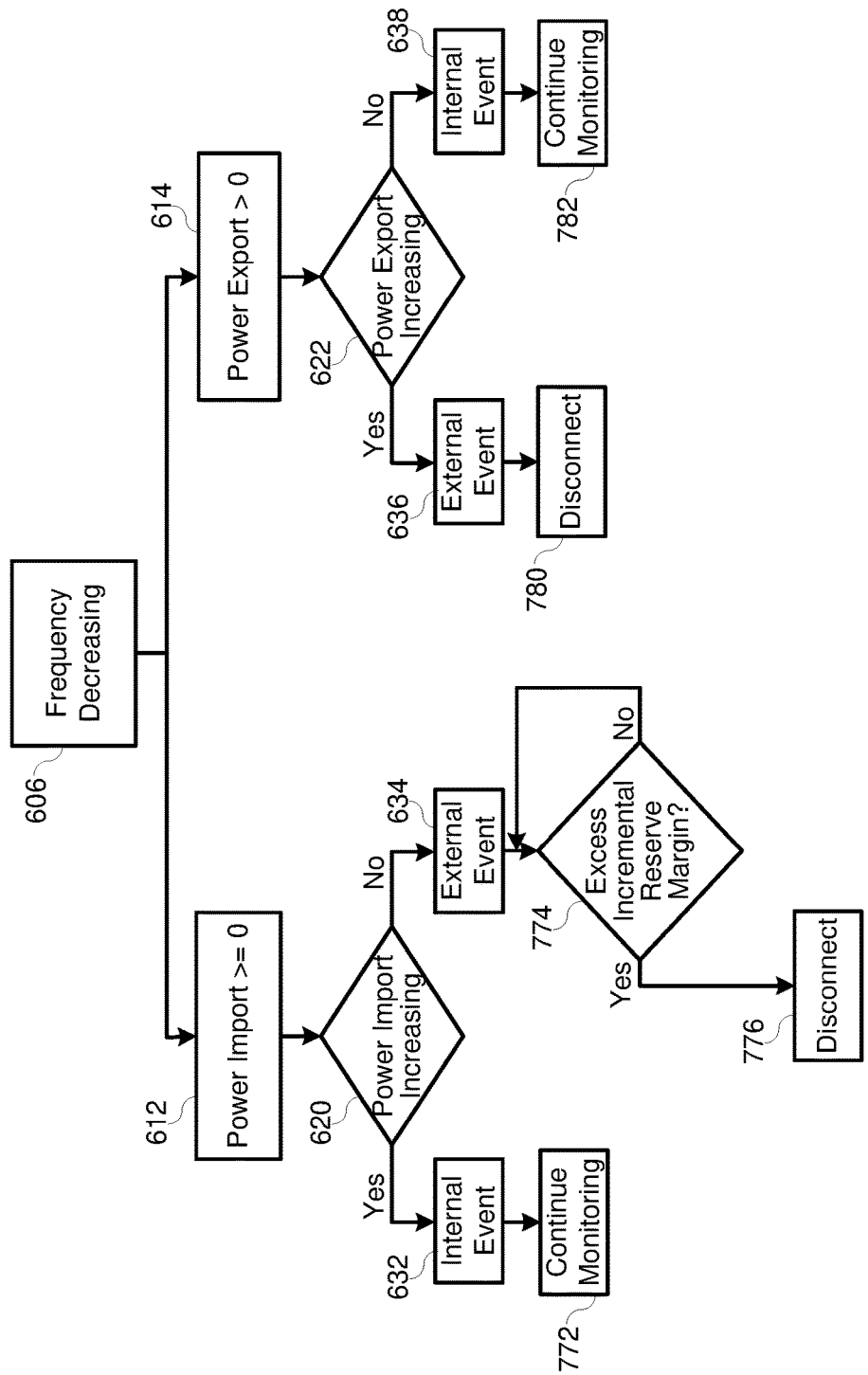
FIG. 7B illustrates a flow chart of a method for protecting an electric power delivery system using frequency excursions, power flow information, and incremental reserve margin according to several embodiments herein.

FIG. 7B illustrates a method that may be used to protect an electric power delivery system similar to that illustrated in FIG. 6, with the added determination of whether excess incremental reserve margin exists. In particular, after determination of a frequency excursion and the frequency is decreasing 606 (loss of generation), with power being imported 612, and the power import not increasing 620, the system may determine that the event is external 634 to the distributed site, but before disconnection, the method may determine whether excess incremental reserve margin exists 774. If there is not sufficient incremental reserve margin, then the system may continue to monitor. However, if the system determines that there is excess decremental reserve margin 774, then because the event is external, the system may determine to disconnect 776 the distributed site from the electric power delivery system. In one particular embodiment, the method may determine whether the incremental reserve margin exceeds the power import. When the incremental reserve margin does exceed the power import (excess incremental reserve margin exists), then the method disconnects the distributed site from the electric power delivery system and effects generation balancing of the distributed site. When the incremental reserve margin does not exceed the power import (no excess incremental reserve margin exists), then the method does not disconnect the distributed site from the electric power delivery system, and continues to monitor. Generation balancing may include shedding generation, adding load, or the like such that the electric power generated matches the electric power consumed on the distributed site.

However, when power is being exported 614 for an excursion where frequency is decreasing 606, the system determines whether the power export is increasing 622. If the power export is increasing, then it is determined that the event is external 636, and the method may determine to disconnect 780 from the electric power delivery system.

For instances where an internal event is determined 632, 638, the method may continue to monitor 772, 782 the electric power delivery system. Continued monitoring may include continued monitoring for frequency excursions, external or internal events, power flow, overcurrent, undervoltage, or any manner of electric power system monitoring and protection.

Excess incremental and decremental reserve margin may be determined using predetermined or set incremental and decremental reserve margin settings, compared with the power presently consumed. In several embodiments, the reserve margins may be determined for the distributed site only. In several embodiments herein, the determination of "excess" incremental or decremental reserve margin may include a buffer between the system state and the reserve margin setting. That is, it may be determined that "excess" reserve margin does not exist when the system state is within a predetermined margin of the set reserve margin.

Figure 8A:
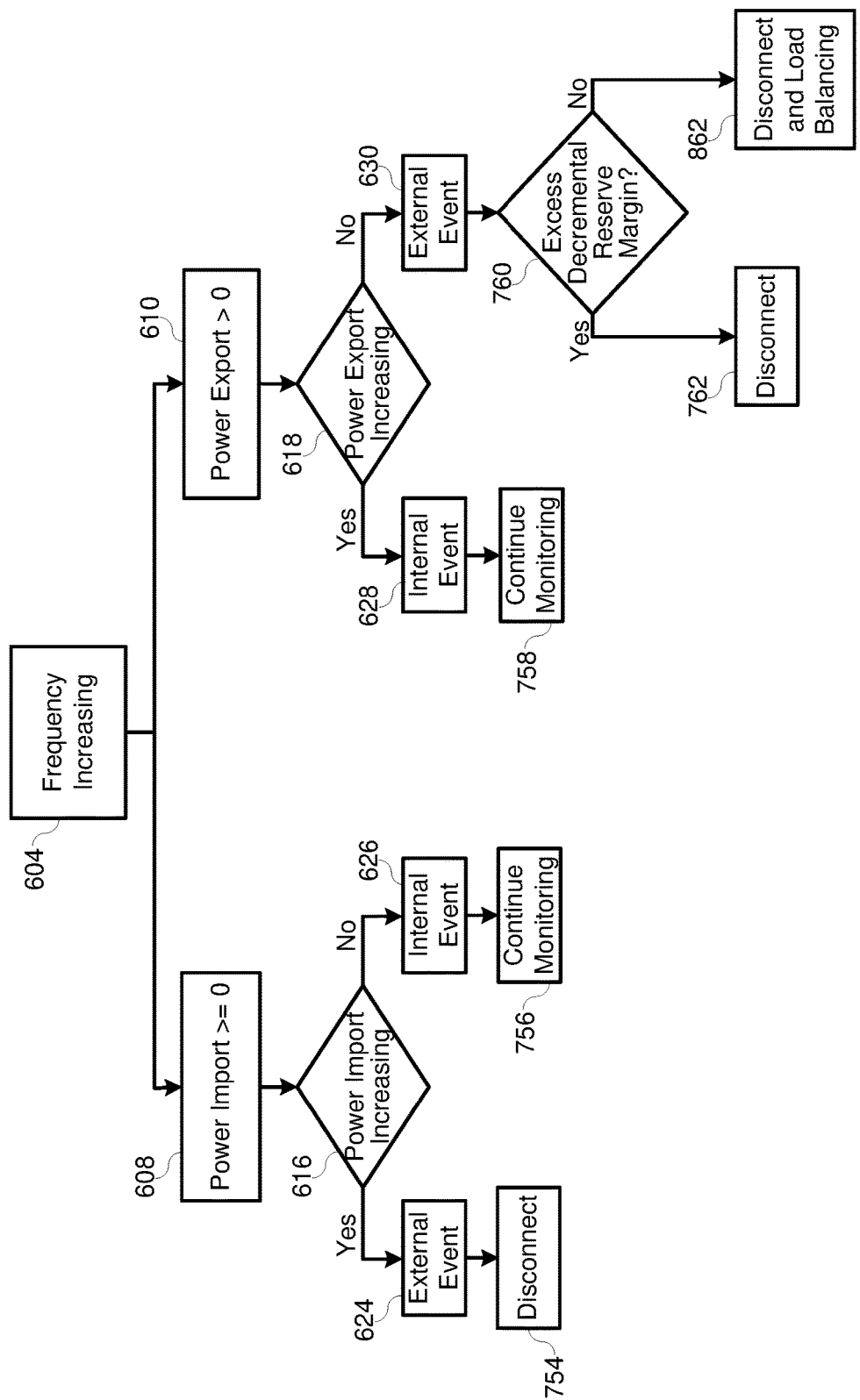
FIG. 8A illustrates a flow chart of a method for protecting an electric power delivery system using frequency excursions, power flow information, and decremental reserve margin according to several embodiments herein.

FIG. 8A illustrates a method similar to that illustrated in FIG. 7A. According to the embodiment illustrated in FIG. 8A, when no excess decremental reserve margin is determined 760, the method does not continue monitoring, but instead disconnects from the electric power delivery system, and undertakes load balancing operations.

Figure 8B:
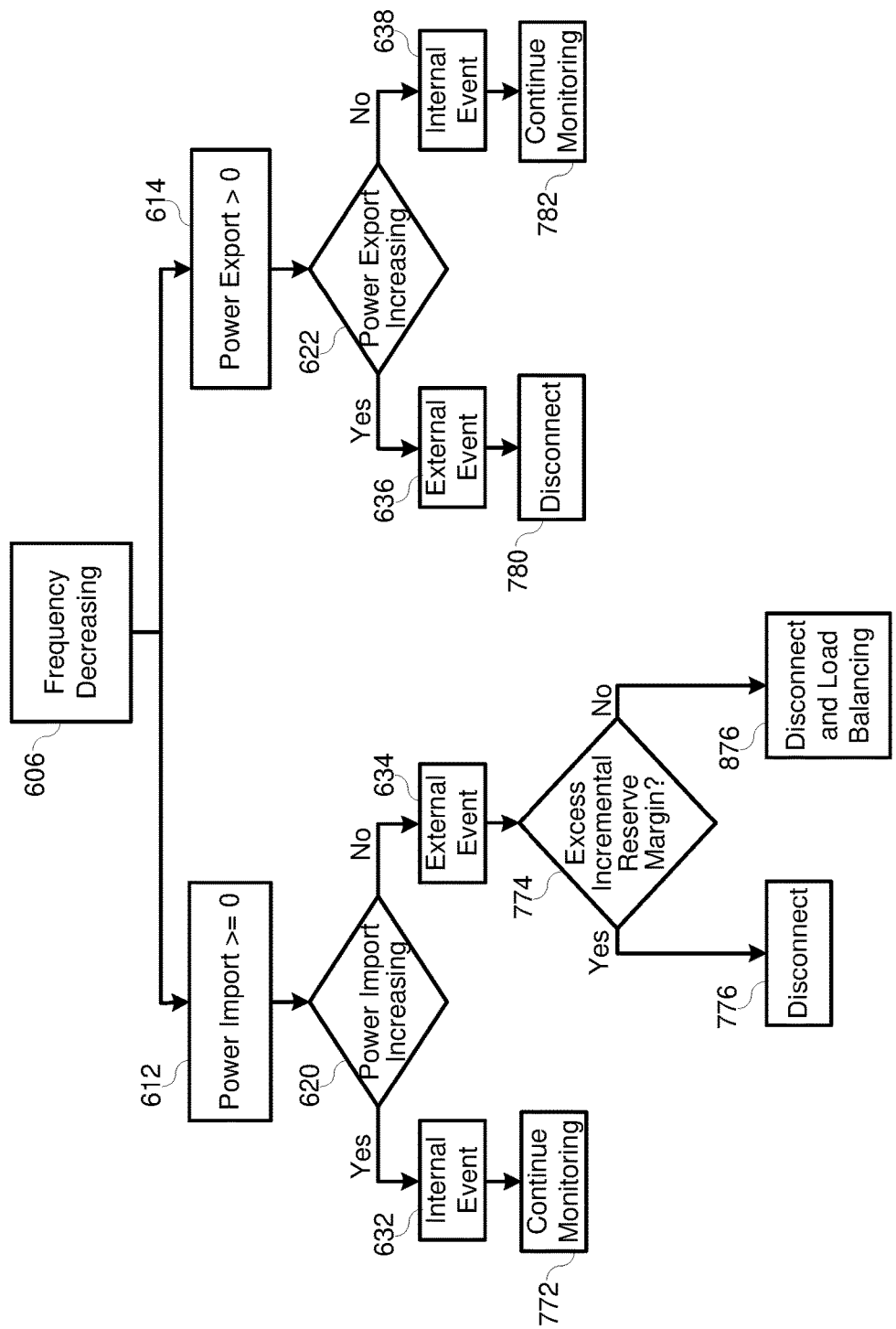
FIG. 8B illustrates a flow chart of a method for protecting an electric power delivery system using frequency excursions, power flow information, and incremental reserve margin according to several embodiments herein.

Similarly, FIG. 8B illustrates a method similar to that illustrated in FIG. 7B. According to the embodiment illustrated in FIG. 8B, when no excess incremental reserve margin is determined 774, the method does not continue monitoring, but instead disconnects from the electric power delivery system, and undertakes load balancing operations.

Figure 9B:
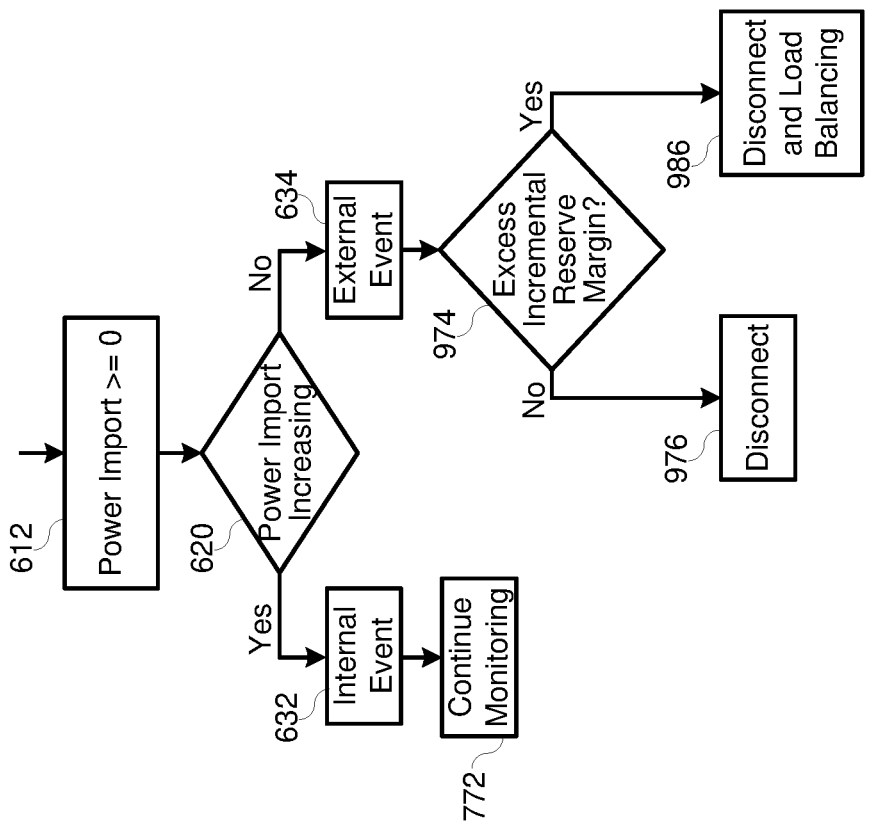
FIG. 9B illustrates a portion of a flow chart of another embodiment of a method for protecting an electric power delivery system using incremental reserve margin.
Figure 9A:
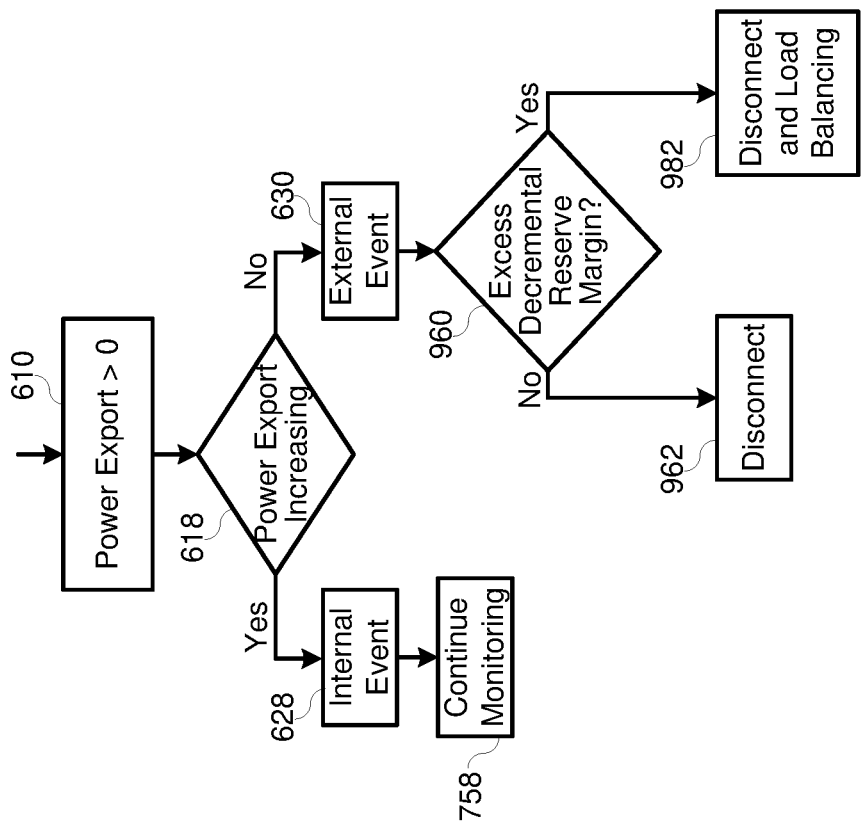
FIG. 9A illustrates a portion of a flow chart of another embodiment of a method for protecting an electric power delivery system using decremental reserve margin.

In yet another embodiment, as illustrated in FIG. 9A, upon determination that frequency is increasing 604, power export is greater than zero 610, power export is not increasing 618, the event is external 630. The method may then determine if excess decremental reserve margin exists 960. Determination of excess decremental reserve margin may be made using any of the methods described herein. In this embodiment, if excess decremental reserve margin does not exist 960, the method disconnects from the electric power delivery system 962. If excess decremental reserve margin does exist, then the method disconnects from the electric power delivery system, and performs load balancing operations 982. Although not separately illustrated, upon determination that excess decremental reserve margin does exist, the method may remain connected, continue monitoring, and apply load balancing until excess decremental reserve margin does not exist, at which time the method may disconnect 962. This may give extra time for the system to balance load, and the frequency excursion to begin to recover.

Similarly, in another embodiment, as illustrated in FIG. 9B, upon determination that frequency is decreasing 606, power import is greater than or equal to zero 612, power export is not increasing 620, the event is external 634. The method may then determine if excess incremental reserve margin exists 974. Determination of excess incremental reserve margin may be made using any of the methods described herein. In this embodiment, if excess incremental reserve margin does not exist 974, the method disconnects from the electric power delivery system 976. If excess incremental reserve margin does exist, then the method disconnects from the electric power delivery system, and performs load balancing operations 986. Although not separately illustrated, upon determination that excess incremental reserve margin does exist, the method may remain connected, continue monitoring, and apply load balancing until excess incremental reserve margin does not exist, at which time the method may disconnect 976. This may give extra time for the system to balance load, and the frequency excursion to begin to recover.

The embodiments described in conjunction with FIGS. 5-7B may be performed using an IED such as IED 300 of FIG. 2 or 3. Portions of the embodiments may be performed using the Frequency Module 314, Power Export Module 318, and/or Protective Action Module 320. When a determination is made to disconnect the distributed site from the electric power delivery system, such an action may be effected using an IED such as IED 108 of FIG. 1, 200 of FIG. 2, and/or 300 of FIG. 3. For example, the IED may signal a circuit breaker such as circuit breaker 160 of FIG. 1 to open, disconnecting the distributed site 146 from the remainder of the electric power delivery system. The signal from the IED may be sent using outputs, a communications interface, an equipment interface, or the like. Accordingly, an action for protection or control of the electric power delivery system is effected using the embodiments described herein.

In various embodiments, the reserve margin may be used for further protective actions of the distributed site. In embodiments where it is determined that the frequency excursion includes an increasing frequency 604, power import and the event is external to the distributed site the excess decremental reserve margin may be compared against the power import or power export.

The embodiments herein provide an improvement in the operation of an intelligent electronic device for protection of an electrical delivery system. Furthermore, the embodiments herein provide an improvement in the protection of an electrical power delivery system. In particular, the embodiments described herein allow for a distributed site to remain connected to the electric power delivery system under a frequency excursion when the disturbance is internal to the distributed system, providing a longer opportunity for the system to ride through the disturbance. Furthermore, the embodiments described herein provide for accelerated disconnection of the distributed system from the electric power delivery system under frequency excursion when the disturbance is external to the distributed system such that the external disturbance does not have further effect on the frequency or reliability of the distributed site. Accordingly, the distributed site can continue operation even after and during a frequency excursion where the disturbance is outside of the distributed site.

While specific embodiments and applications of the disclosure have been illustrated and described, it is to be understood that the disclosure is not limited to the precise configurations and components disclosed herein. Moreover, principles described herein may also be utilized for protecting an electrical system from over-frequency conditions, wherein power generation would be shed rather than load to reduce effects on the system. Accordingly, many changes may be made to the details of the above-described embodiments without departing from the underlying principles of this disclosure. The scope of the present invention should, therefore, be determined by the following claims.

What is claimed is:

1. An intelligent electronic device for detecting a disturbance external to a distributed site in an electrical power delivery system, comprising:
  an input for receiving a signal of the electrical power delivery system corresponding to currents and voltage to the distributed site;
  a processing unit configured to:
    determine from the signal a frequency deviation of electrical power delivery system from nominal frequency and a rate-of-change of frequency of the electrical power delivery system, the frequency deviation and the rate-of-change of frequency defining an operating point of the electrical power delivery system, the processing unit being operable to compare the operating point to a protection characteristic of the intelligent electronic device,
    determine a power flow between the distributed site and the electric power delivery system;
    determine a change in power flow over time;
    determine that a disturbance comprises an external disturbance based on the operating point and the change in power flow; and
    determine a protective action when the disturbance is determined to be an external disturbance; and
  an output in communication with the processing unit to effect the protective action disconnecting the distributed site from the electrical power delivery system.

2. The intelligent electronic device of claim 1, wherein when the operating point indicates decreasing change in frequency and the power flow into the distributed site is decreasing, an external disturbance is indicated.

3. The intelligent electronic device of claim 2, wherein the processing unit is further configured to determine whether excess incremental reserve margin exists; and the protective action is determined when the external disturbance is detected and excess incremental reserve margin does exist.

4. The intelligent electronic device of claim 1, wherein when the operating point indicates increasing change in frequency and the power flow into the distributed site is increasing, an external disturbance is indicated.

5. The intelligent electronic device of claim 4, wherein the processing unit is further configured to determine whether excess decremental reserve margin exists; and the protective action is determined when the external disturbance is detected and excess decremental reserve margin does exist.

6. The intelligent electronic device of claim 1, wherein when the operating point indicates decreasing change in frequency and the power flow out from the distributed site is increasing, an external disturbance is indicated.

7. The intelligent electronic device of claim 6, wherein the processing unit is further configured to determine whether excess incremental reserve margin exists; and the protective action is determined when the external disturbance is detected and excess incremental reserve margin does exist.

8. The intelligent electronic device of claim 1, wherein when the operating point indicates increasing change in frequency and the power flow out from the distributed site is not increasing, an external disturbance is indicated.

9. The intelligent electronic device of claim 8, wherein the processing unit is further configured to determine whether excess decremental reserve margin exists; and the protective action is determined when the external disturbance is detected and excess decremental reserve margin does exist.

10. The intelligent electronic device of claim 1, wherein when an external disturbance is determined, the protective action comprises opening a breaker to separate the distributed site from the electrical power delivery system.

11. A method for detecting a disturbance external to a distributed site in an electrical power delivery system, comprising the steps of:
an intelligent electronic device in communication with the distributed site measuring a signal of the electrical power delivery system corresponding to currents and voltage to the distributed site;
determining from the signal a frequency deviation of electrical power delivery system from nominal frequency and a rate-of-change of frequency of the electrical power delivery system, the frequency deviation and the rate-of-change of frequency defining an operating point of the electrical power delivery system
comparing the operating point to a protection characteristic of the intelligent electronic device,
determining a power flow between the distributed site and the electric power delivery system;
determining a change in power flow over time;
determining that a disturbance comprises an external disturbance based on the operating point and the change in power flow;
determining a protective action when the disturbance is determined to be an external disturbance; and
effecting the protective action disconnecting the distributed site from the electrical power delivery system.

12. The method of claim 11, wherein when the operating point indicates decreasing change in frequency and the power flow into the distributed site is decreasing, an external disturbance is indicated.

13. The method of claim 12, further comprising the step of determining whether excess incremental reserve margin exists; and the protective action is determined when the external disturbance is detected and excess incremental reserve margin does exist.

14. The method of claim 11, wherein when the operating point indicates increasing change in frequency and the power flow into the distributed site is increasing, an external disturbance is indicated.

15. The method of claim 14, further comprising the step of determining whether excess decremental reserve margin exists; and the protective action is determined when the external disturbance is detected and excess decremental reserve margin does exist.

16. The method of claim 11, wherein when the operating point indicates decreasing change in frequency and the power flow out from the distributed site is increasing, an external disturbance is indicated.

17. The method of claim 16, further comprising the step of configured to determine whether excess incremental reserve margin exists; and the protective action is determined when the external disturbance is detected and excess incremental reserve margin does exist.

18. The method of claim 11, wherein when the operating point indicates increasing change in frequency and the power flow out from the distributed site is not increasing, an external disturbance is indicated.

19. The method of claim 18, further comprising the step of determining whether excess decremental reserve margin exists; and the protective action is determined when the external disturbance is detected and excess decremental reserve margin does exist.

20. The method of claim 11, wherein when an external disturbance is determined, the protective action comprises opening a breaker to separate the distributed site from the electrical power delivery system.

* * * * *